United States Patent
Patel et al.

(10) Patent No.: US 8,387,119 B2
(45) Date of Patent: Feb. 26, 2013

(54) SECURE APPLICATION NETWORK

(75) Inventors: Amol Bhasker Patel, Los Altos, CA (US); Suraj Satheesan Menon, San Jose, CA (US)

(73) Assignee: Ebay Inc., San Jose, CA (US)

( * ) Notice: Subject to any disclaimer, the term of this patent is extended or adjusted under 35 U.S.C. 154(b) by 550 days.

(21) Appl. No.: 12/643,656

(22) Filed: Dec. 21, 2009

(65) Prior Publication Data
US 2011/0154439 A1 Jun. 23, 2011

(51) Int. Cl.
*G06F 21/00* (2006.01)
*G06F 15/16* (2006.01)

(52) U.S. Cl. .............. 726/4; 726/3; 717/173; 717/177

(58) Field of Classification Search ............... 726/3, 4; 717/172–178
See application file for complete search history.

(56) References Cited

U.S. PATENT DOCUMENTS

| | | | | |
|---|---|---|---|---|
| 8,171,529 B2* | 5/2012 | Dadu et al. | | 726/4 |
| 2006/0080352 A1* | 4/2006 | Boubez et al. | | 707/102 |
| 2007/0248729 A1* | 10/2007 | Sandu | | 426/490 |
| 2009/0198995 A1* | 8/2009 | Finlay | | 713/153 |
| 2009/0210702 A1 | 8/2009 | Welingkar et al. | | |
| 2009/0248729 A1* | 10/2009 | Bruno et al. | | 707/102 |
| 2010/0011219 A1* | 1/2010 | Burton et al. | | 713/182 |
| 2010/0145861 A1* | 6/2010 | Law et al. | | 705/76 |
| 2010/0192170 A1* | 7/2010 | Raleigh | | 725/1 |
| 2011/0086616 A1* | 4/2011 | Brand et al. | | 455/411 |

* cited by examiner

*Primary Examiner* — Krisna Lim
(74) *Attorney, Agent, or Firm* — Haynes and Boone, LLP

(57) ABSTRACT

Systems and methods are provided for a secure application network according to one or more embodiments. In one embodiment, a system for a secure application network comprises a service provider server adapted to interact with an application development server and a client device over a network, wherein the service provider server is adapted to implement the secure application network system. The system also comprises one or more processors and one or more memories adapted to store a plurality of machine-readable instructions which when executed by the one or more processors are adapted to cause the secure application network system to: maintain a plurality of records associated with at least one application developer using the application development server; authenticate the at least one application developer based on the plurality of records; and enable the at least one authenticated application developer to create and/or deploy one or more applications operable on the client device to be downloaded by a user of the client device from the secure application network system.

27 Claims, 4 Drawing Sheets

SECURE APPLICATION NETWORK

BACKGROUND

1. Technical Field

Embodiments of the present disclosure generally relate to application platforms, and more particularly, to methods and systems for providing a secure network for application platforms.

2. Related Art

Existing application platforms allow an application developer to develop and deploy applications that may be used for various purposes in various contexts. A consumer may load applications on a mobile device, which may run the applications after the mobile device has been manufactured and purchased. The applications may be developed or sold by the manufacturer of the device or by third party application developers. In general, application developers want their applications to be housed and used in as many devices as possible and provide services that are secure and high quality. Consumers expect convenient and secure services within a trusted environment when downloading and using the applications. However, existing application platforms have a number of shortcomings related to security. For example, application developers may have different resources, preferences or policies for different types of security mechanisms, some preferring security mechanisms that are low in cost or easier to implement. Also, if a mobile device is configured to load applications from third party developers, there may be a risk of attack of the device and data stored on the device, for example by viruses, spyware or other malware. Furthermore, consumers and third party application developers may be concerned about entering confidential information or credentials within an existing application platform due to problems such as phishing. Users need to know that the their confidential information or credentials are appropriately securitized. Although the application developer and the consumer may each have its own culture and expectations, they all have the same basic requirement regarding an application platform—the need for security and confidentiality.

SUMMARY

As will be further described herein in relation to various embodiments, systems and methods are provided for a network of secure platforms to enable application developers to securely develop and deploy applications to users or consumers so that users may download applications from a trusted environment.

In accordance with an embodiment of the disclosure, a system for a secure application network comprises a service provider server adapted to interact with an application development server and a client device over a network, wherein the service provider server is adapted to implement the secure application network system. The system also comprises one or more processors and one or more memories adapted to store a plurality of machine-readable instructions which when executed by the one or more processors are adapted to cause the secure application network system to: maintain a plurality of records associated with at least one application developer using the application development server; authenticate the at least one application developer based on the plurality of records; and enable the at least one authenticated application developer to create and/or deploy one or more applications operable on the client device to be downloaded by a user of the client device from the secure application network system.

In accordance with another embodiment of the disclosure, a computer-implemented method for providing a secure application network by a service provider server comprises maintaining a plurality of records associated with at least one application developer. The method also comprises authenticating the at least one application developer based on the plurality of records. The method further comprises enabling the at least one authenticated application developer to create and/or deploy one or more applications to users from the secure application network.

In accordance with another embodiment of the disclosure, an infrastructure for a secure network of platforms comprises: a plurality of platforms correspondingly associated with at least one application developer; one or more processors; and one or more memories adapted to store a plurality of machine-readable instructions which when executed by the one or more processors are adapted to cause the secure application network system to: receive and maintain identification information associated with the at least one application developer; authenticate the at least one application developer based on the received and maintained identification information; and enable the at least one authenticated application developer to create and/or deploy applications to a user of a client device wherein the client device is adapted to download the applications from the secure network of platforms.

These and other features and advantages of the embodiments of the present disclosure will be more readily apparent from the detailed description of the embodiments set forth below taken in conjunction with the accompanying drawings.

BRIEF DESCRIPTION OF THE FIGURES

Like element numbers in different figures represent the same or similar elements.

DETAILED DESCRIPTION

Figure 1:
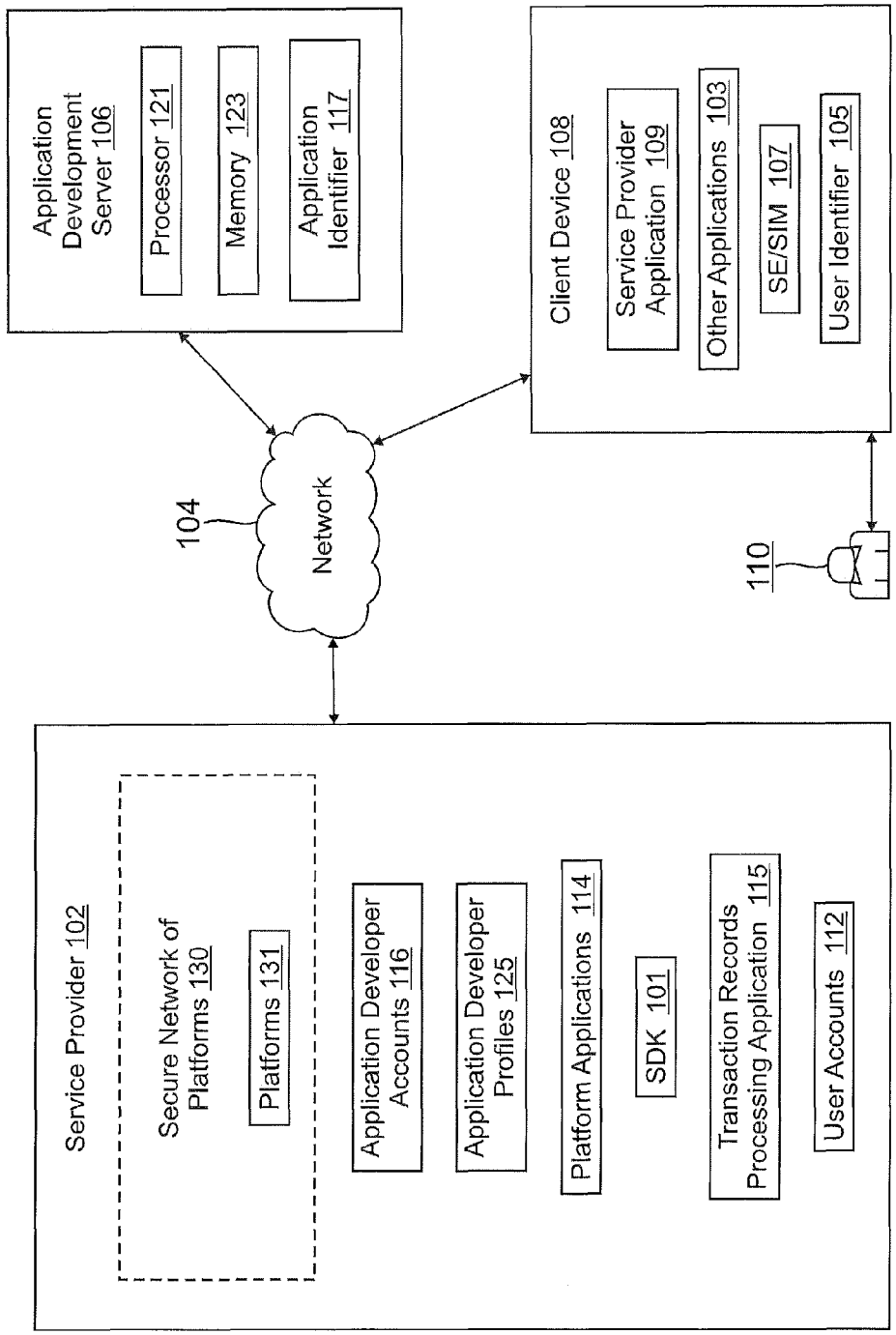
FIG. 1 illustrates a system for providing a secure network of platforms according to an embodiment of the present disclosure.

In accordance with various embodiments described herein, methods and systems provide a network of platforms to enable application developers to create and/or deploy applications to users in a secure manner. The applications are certified so that a user may use the secure network of platforms to download applications with confidence that the applications are downloaded from an authenticated and secure location, and that sensitive or confidential information is not provided to a fraudster.

Referring now to the drawings wherein the showings are for purposes of illustrating embodiments of the present disclosure only, and not for purposes of limiting the same, FIG.

1 illustrates a system for providing a secure network of platforms according to an embodiment of the present disclosure.

A service provider 102 is adapted to communicate or exchange data with an application development server 106 and a client device 108 and correspondingly a user 110 (also referred to as a "customer" or "consumer"), via a network 104. Data connections between service provider 102 and application development server 106 and client device 108 may take place, for example, via SMS or a Wireless Application Protocol (WAP) over network 104. In addition, according to one or more embodiments, service provider 102 may have other data connections (not shown), for example, with subscriber Internet companies, Internet financial companies, Internet brokers or other Internet companies. In one embodiment, service provider 102 may be implemented by a payment service provider such as PayPal™, Inc., or eBay™, Inc. of San Jose, Calif.

Application development server 106 includes one or more processors 121 coupled to one or more memories 123 configured to process creation and/or deployment of applications by application developers to be downloaded by one or more users. The application developer may be an entity, for example an individual or a corporation, which develops one or more portions of an application, for example a software application, operable on different types of client devices. Examples of application developers include iTunes™, Sprint™, mFoundry™, Tivo™, Wii™, Playstation™, RIM™ application store, or the like. The application developer may be known or unknown to the manufacturer of client device 108.

Service provider 102 may implement an infrastructure for a secure network of platforms 130 (also referred to as a "secure application network") to enable application developers using application development server 106 to create and deploy applications to client device 108.

Client device 108 may be configured to safely download, install, and run applications created and/or deployed by application development server 106 from the secure network of platforms 130. The secure network of platforms 130 may include one or more platforms 131 associated with application developers involved with any context or purpose including, for example, iTunes™, Sprint™, mFoundry™, Tivo™, Wii™, Playstation™, RIM™ application store, or the like. Advantageously, service provider 102 may market applications in the secure network of platforms 130 as certified so that user 110 may download the certified applications with confidence that the applications are not fraudulent and user 110 is not providing sensitive or confidential information to a fraudster.

Service provider 102 may maintain a plurality of application developer accounts 116 and user accounts 112, each of which may include account information associated with specific application developers and users such as individuals, respectively. For example, in one embodiment, account information may include private or confidential information of an application developer or a user such as account numbers, passwords, credit/debit card information, bank information, or other information that may be used to facilitate online or other types of transactions between service provider 102 and application developers or users.

According to an embodiment, platform application 114 of service provider 102 may be configured to interact with application developer server 106 so that user 110 (via client device 108) is enabled to securely download applications of application developer server 106 from the secure network of applications 130. The application developer may first register, prepare or otherwise sign up to use the secure network of platforms 130 implemented by service provider 102 via platform application 114.

In this regard, service provider 102 may provide information to application development server 106 to assist the application developer in creating and/or deploying an application such as a software application in a manner which is compatible with client device 108. For example, service provider 102 may provide application development server 106 with information such as a Software Development Kit (SDK) 101, which may comprise a collection of software tools and specifications that allows application development server 106, and correspondingly the application developer, to build and test an application operable on client device 108. The application would then have an embedded secure interface to SDK 101 of service provider 102.

Service provider 102 may assign each application a unique identifier associated with application identifier 117 for both internal and external identification.

In the system for providing a secure network of platforms according to an embodiment, a transaction using client device 108 and service provider 102 may additionally generate certain data to provide feedback on selected applications downloaded by user 110 as will be described below.

Service provider 102 may provide a transaction records processing application 115 that may be configured to receive transaction information from client device 108 over network 104 and store the transaction information in a plurality of transaction records that are associated with individual user accounts 112. Also, as further described herein, transaction records may be implemented to store transaction information associated with particular applications, for example online, NFC or other types of downloaded applications, between client device 108 or user 110 and application developer server 106.

Access to application transaction records may be controlled by service provider 102, for example, to prevent the storage or retrieval of the transaction records by other parties without the permission of user 110. In this regard, service provider 102 may require the receipt of a security identifier such as a valid password, a user identifier, a username, and/or other appropriate information before transaction records may be stored, changed, and/or retrieved.

It will be appreciated that by performing a plurality of transactions by user 110 with application development server 106, a plurality of transaction records may be stored by service provider 102 and associated with an appropriate user account 112, which is associated with user 110.

The centralized storage of transaction information or data of service provider 102 may be combined and enhanced with data obtained from business partners of service provider 102 including subscriber acquirers, brands, Internet companies, or other entities. In one embodiment where service provider 102 is PayPal™, Inc., the centralized stored transaction data may be combined with data obtained from PayPal's business partners such as eBay™, thus resulting in even richer and more extensive data.

Client device 108 may be implemented using any appropriate combination of hardware and/or software configured for wired and/or wireless communication over a network. For example, in one embodiment, client device 108 may be implemented as a mobile device of user 110 in communication with network 104 such as the Internet or another network. In other embodiments, client device 108 may be implemented as a personal computer, wireless telephone, personal digital assistant (PDA), key fob, smart phone, smart card, notebook computer, game console, digital video recorder (DVR), and/ or other types of computing devices. Furthermore, client device 108 may be enabled for NFC, Bluetooth, online, infrared communications and/or other types of communications.

Client device 108 may include various applications as may be desired in particular embodiments to provide desired features to client device 108. For example, in various embodiments, applications may include security applications for implementing client-side security features, programmatic client applications for interfacing with appropriate application programming interfaces (APIs) over a network, or other types of applications.

Client device 108 may further include one or more user identifiers 105 that may be implemented, for example, as operating system registry entries, cookies associated with a browser application, identifiers associated with hardware of client device 108, or other appropriate identifiers. In one embodiment, a user identifier may be used by service provider 102 to associate client device 108 or user 110 with a particular account maintained by service provider 102.

According to an embodiment, service provider 102, for example in a role as a Trusted Service Manager (TSM), may work with a Mobile Network Operator (MNO) to put a certificate issued by service provider 102 in a Secure Element (SE) or Subscriber Identity Module (SIM) card 107 of client device 108. The SE or SIM card 107 may follow security guidelines such as FIPS 140-2 Level 2/3. Service provider issued certificates already installed in client device 108 may be done for personalization purposes. When users or customers activate their service provider application 109, such as a PayPal application, which may already be built in client device 108, user 110 may be asked to select a personal identification number (PIN) or a passcode, which may be optional or mandatory. The PIN or passcode protects the private key of the certificate.

Service provider 102 has multiple "verified" statuses. Hence, the centralized data storage capabilities of service provider 102 facilitate both a rule-based system and behavioral engine that may generate proprietary fraud models based on such rich and extensive data. Service provider 102 is able to offer and provide a service that may work in real time to identify information and data associated with application development server 106 and client device 108 to detect and prevent transaction fraud and without compromising privacy.

Client device 108, application developer server 106, and service provider 102 may each include one or more processors, memories, and other appropriate components for executing instructions such as program code and/or data stored on one or more computer readable mediums to implement the various applications, data, and methods described herein. For example, such instructions may be stored in one or more computer readable mediums such as memories or data storage devices internal and/or external to various components of the system, and/or accessible over a network, which may be implemented as a single network or a combination of multiple networks. For example, in various embodiments, network 104 may include the Internet or one or more intranets, landline networks, wireless networks, and/or other appropriate types of networks.

Figure 2:
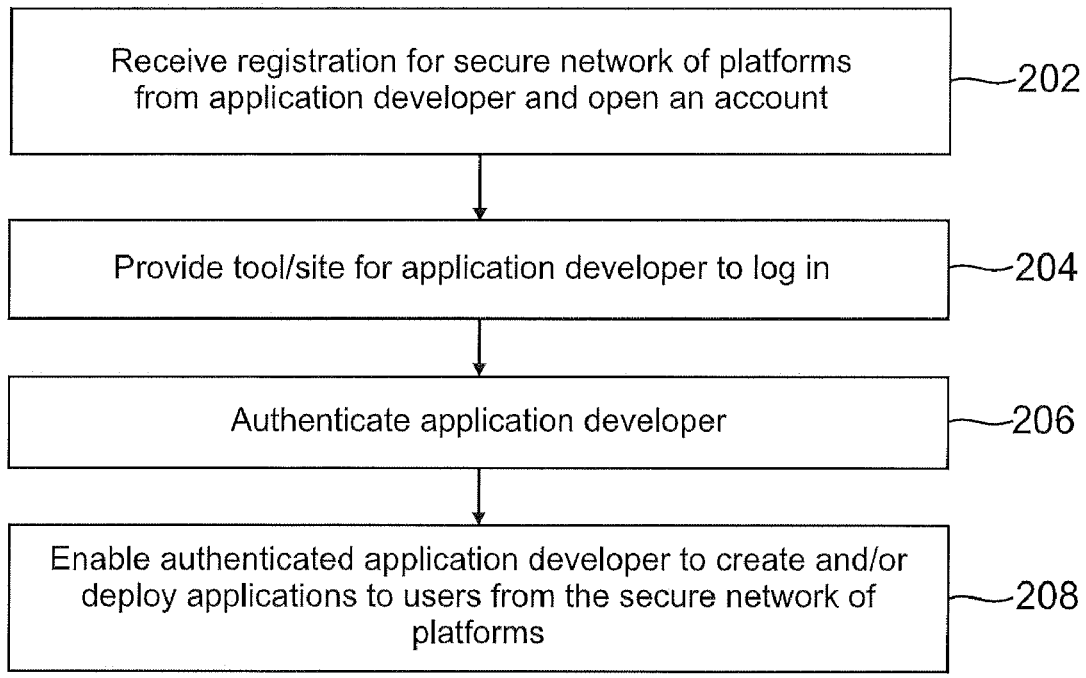
FIG. 2 is a flow diagram illustrating a method for providing a secure network of platforms according to an embodiment of the present disclosure.

FIG. 2 is a flow diagram illustrating a method for providing a secure network of platforms according to an embodiment of the present disclosure. The method of FIG. 2 may be implemented by the system of FIG. 1 according to an embodiment.

In block 202, service provider 102 may receive registration information from an application developer using application development server 106 to form a secure platform 131 in the secure network or platforms 130 facilitated by service provider 102 and to open an application developer account 116 (as illustrated in FIG. 1 according to an embodiment). In this regard, it will be appreciated that the application developer may provide account information to service provider 102 over network 104 through, for example, a secure connection between application development server 106 and service provider 102. For example, in one embodiment, service provider 102 may provide a webpage that may be viewed by an application developer through a browser application.

As a result of such registration, service provider 102 may assign, and application development server 106 may store, a specific application identifier 117 that may be used to identify the particular application developer as having an application developer account 116 maintained by service provider 102. The application developer identifier may be implemented, for example, as one or more cookies, operating system registry entries, hardware identifiers, or other types of identifiers. Other data specific to the application developer may be created and stored by service provider 102, including for example, signature information and an application developer profile 125. Signature information is the way to identify the application developer. Furthermore, application developer profile 125 may be created, for example, based on a developer's typical behavior in transactions.

In block 204, once an application developer has registered and opened an account for the secure network of platforms 130 of service provider 102, the application developer may interact and exchange data with service provider 102. In an embodiment, the application developer may log in to service provider 102 via a mechanism such as a tool or site provided by service provider 102 in order to create or deploy an application. In this regard, the application developer may be required to input an identifier such as a PIN or a passcode for identification purposes.

In block 206, service provider 102 authenticates the application developer. For example, service provider 102 may first verify that the log in information provided by the application developer such as a PIN or passcode matches information maintained by service provider 102. For example, information in connection with application identifier 117 of application development server 106 is verified. Other data maintained at service provider 102 such as signature information and application developer profile information, may also be used to correlate and authenticate the application developer. According to an embodiment, service provider 102 may compare each transaction by an application developer with application developer data or centralized stored data maintained by service provider 102. If a particular transaction by the application developer appears to be out of line with the application developer's typical transaction profile as maintained in application developer profile 125, a fraud alert may be raised. For example, if the application developer generally only deals with transactions over the telephone for a particular technology, a transaction related to a different odd technology may raise a fraud alert. Other data that may raise fraud alerts include the number of transactions, the time of day or the time of year when the transaction takes place. Finally, transactions made over application development server 106 may also provide geo-location information using for example a Global Positioning Satellite (GPS) to identify the location of the application development server 106 (and correspondingly the application developer). The location of application developers may be helpful in establishing risk models for transactions. For example, if the application developer profile indicates that a particular account is based in Northern California, but one or more transactions suddenly appear in Russia, a fraud alert may be issued.

In other embodiments, established application developers such as Apple™ or TiVo™ may work with service provider 102 on the backend to authenticate applications that such application developers provide to users or consumers. Service provider 102 may work with such application developers so that they may provide an API to service provider 102 to accelerate the service provider's verification functionality.

In block 208, once an application developer is authenticated, service provider 102 enables the authenticated application developer to create and deploy applications so that user 110 may securely download applications with confidence that the application is being downloaded from an authenticated and secure location, that is, from a trusted environment as implemented by the service provider's secure network of platforms.

Figure 3:
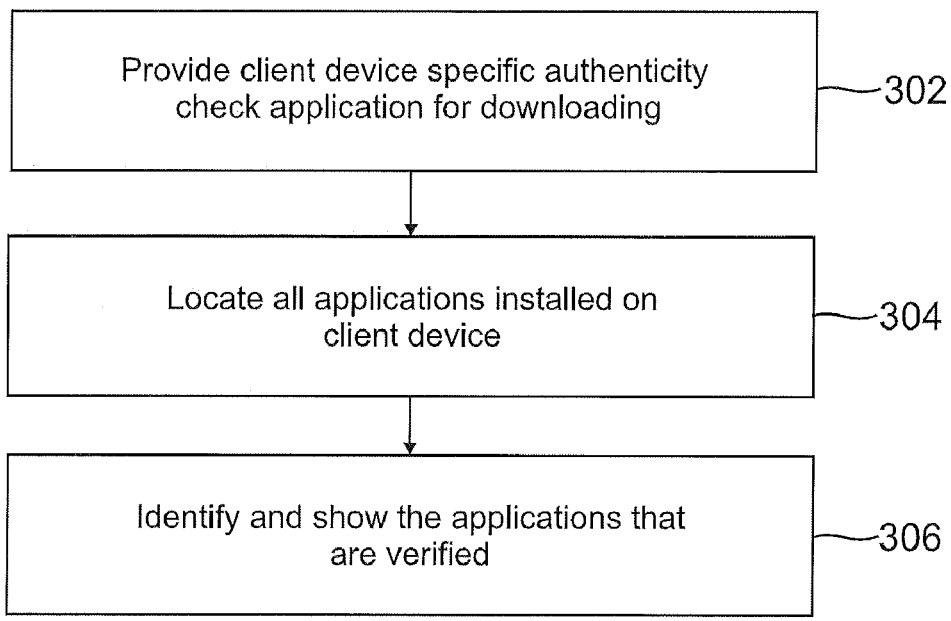
FIG. 3 is a flow diagram illustrating a method for verifying authenticity of applications according to an embodiment of the present disclosure.

FIG. 3 is a flow diagram illustrating a method for verifying authenticity of applications according to an embodiment of the present disclosure. The method of FIG. 3 may be implemented by the system of FIG. 1 according to an embodiment.

In block 302, user 110 may download a client device specific authenticity check application provided by service provider 102. According to an embodiment, user 110 may download the client device specific authenticity check application from platform application 114 of service provider 102 via network 104 as illustrated in FIG. 1.

In block 304, once user 110 downloads the authenticity check application onto client device 108, the authenticity check application may locate all the applications installed on client device 108. Next, the authenticity application conducts a verification routine to verify the authenticity of the applications installed therein as will be described in more detail below with respect to FIG. 4 according to an embodiment.

In block 306, applications whose authenticity has been verified are identified and shown or displayed to user 110 on client device 108.

Figure 4:
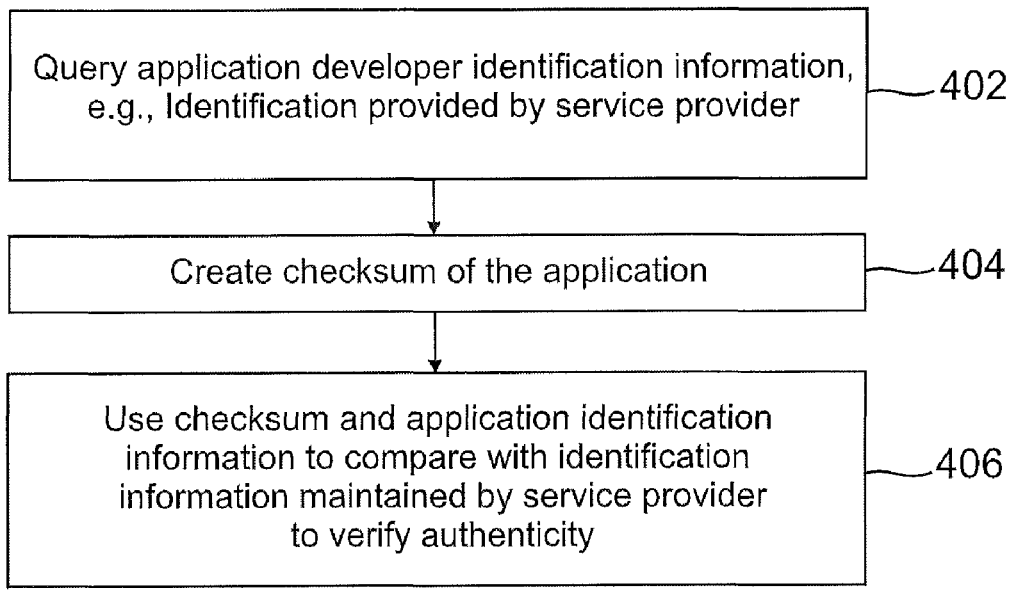
FIG. 4 is a flow diagram illustrating a method for conducting an application verification routine according to an embodiment of the present disclosure.

FIG. 4 is a flow diagram illustrating a method for conducting an application verification routine according to an embodiment of the present disclosure.

In block 402, the authenticity check application as may be implemented in platform application 114 of service provider 102 may be downloaded onto client device 108 as described above. The authenticity check application locates all the applications installed in client device 108 and queries the identification information of each particular application including, for example, the identifier of the application provided by service provider 102 (if applicable), or other types of identifiers.

In block 404, service provider 102 creates a checksum of the application, that is, service provider 102 compiles the identification information of a particular application as installed in client device 108 and as queried by the authenticity check application.

In block 406, using the checksum of the application, service provider 102 compares such checksum of the specific application and corresponding identification information with the application information maintained by service provider 102 in, for example application developer profiles 125 (if any), to verify the authenticity of the application.

Optionally, a service provider identifier as well as other identifiers stored in an application may be used to display any applicable feedback and/or ratings for a particular application to user 110 as will be described in more detail below with respect to FIG. 5 according to an embodiment.

Figure 5:
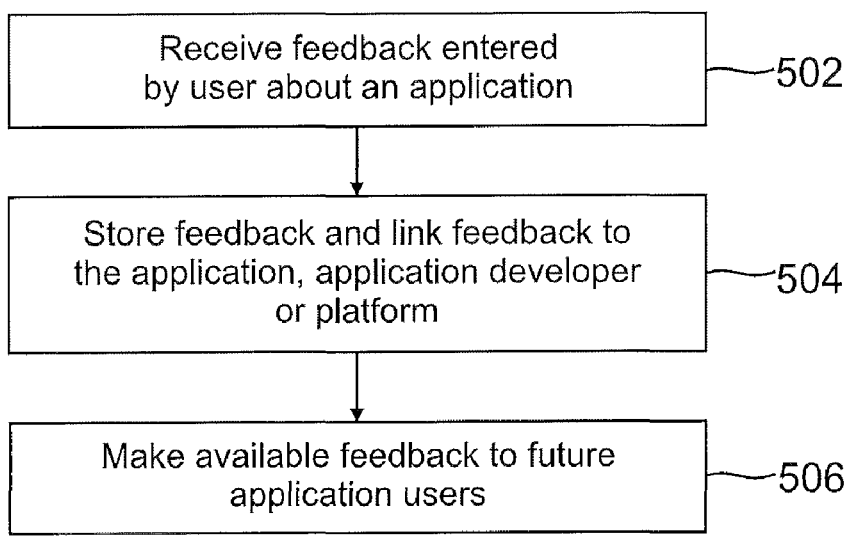
FIG. 5 is a flow diagram illustrating a method for providing application feedback information according to an embodiment of the present disclosure.

FIG. 5 is a flow diagram illustrating a method for providing application feedback information according to an embodiment of the present disclosure.

Service provider 102 including the network of secure platforms may be used to share feedback and/or ratings information provided by a user about an application across different device application platforms. Feedback and/or ratings information may be based, for example, on the quality, user-friendliness, content of the application, or other factors.

In block 502, users may enter, and the service provider receives, feedback and/or ratings information about an application. The user may enter feedback information in the application itself or in an application provided by the service provider such as in the authenticity check application or via a tool or website of service provider 102. According to one or more embodiments, user 110 may also enter feedback and/or ratings information about an application by sending a text message or SMS to service provider 102 in connection with an application.

In block 504, service provider 102 may store the feedback and/or ratings information entered by the users on the backend, for example, service provider 102 may store received application feedback and/or ratings information in transaction record processing application 115. Service provider 102 may then link the feedback and/or ratings information to the application, the application developer and/or the application platform.

In block 506, service provider 102 may provide or make available the feedback and/or ratings information to future users of the application through, for example, a service provider application, tool or website.

The feedback information may also be made available to partners or associated entities of service provider 102 through a secure connection. For example, in embodiments where the service provider is PayPal™, Inc. or eBay™, Inc., feedback provided by users to PayPal™ or eBay™ about various entities such as merchants, bloggers, etc., may also be provided to users of the network of secure platforms via a PayPal™ application through a secure connection. In this regard, for example, the PayPal™ application may call the PayPal™ SDK function to obtain feedback about a particular eBay™ merchant, for example. In turn, the PayPal™ SDK may provide access to the particular merchant ratings and comments.

In addition to verifying authenticity of applications and sharing user-provided application feedback and/or ratings information, the network of secure applications provided by service provider 102 according to one or more embodiments may provide several other conveniences including notifications to users. For example, the secure applications network of service provider 102 may be used to check whether the client device (or user) has the latest version of installed applications, whether an installed application is blacklisted or blocked, or whether a vendor/merchant ratings have changed.

Although various components and steps have been described herein as being associated with client device 108, application development server 106, and service provider 102 of FIG. 1, it is contemplated that the various aspects of such servers illustrated in FIG. 1 may be distributed among a plurality of servers, devices, and/or other entities. For example, in one embodiment, transaction record processing application 115 may be implemented by an entity separate from service provider 102. Accordingly, in such an embodiment, communications described herein performed in relation to transaction record processing application 115 may be provided to a separate entity and need not be routed through service provider 102 in all instances.

Figure 6:
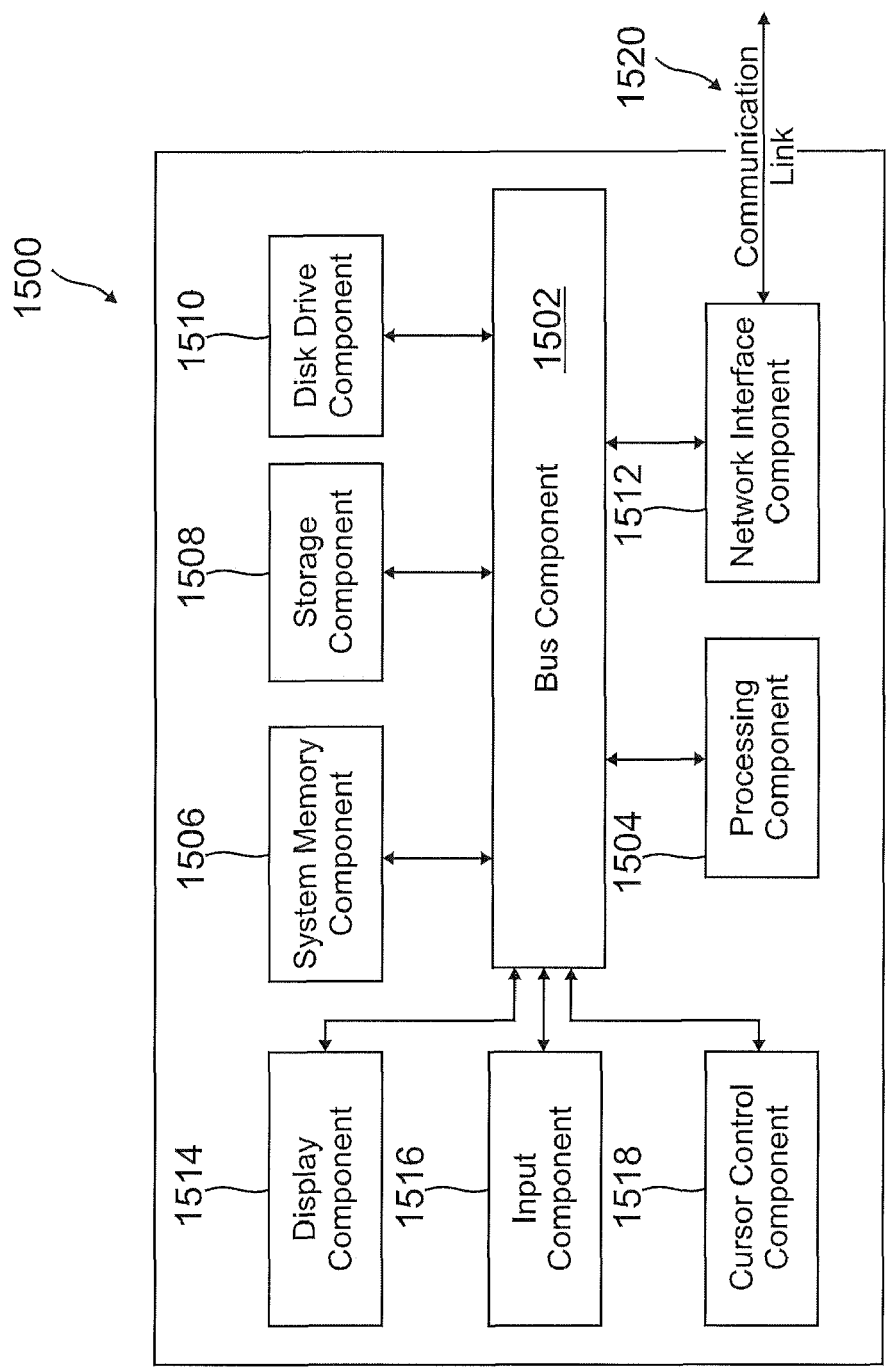
FIG. 6 is a block diagram illustrating a system for implementing a device according to one embodiment of the present disclosure.

Referring now to FIG. 6, a block diagram of a system for implementing a device is illustrated according to one embodiment of the present disclosure.

FIG. 6 is a block diagram of a system 1500 suitable for implementing embodiments of the present disclosure, including client device 108, application development server or device 106, and service provider 102 server or device. System 1500, such as part of a mobile phone, personal computer and/or a network server, includes a bus 1502 or other communication mechanism for communicating information, which interconnects subsystems and components, including one or more of a processing component 1504 (e.g., processor, micro-controller, digital signal processor (DSP), etc.), a system memory component 1506 (e.g., RAM), a static storage component 1508 (e.g., ROM), a network interface component 1512, a display component 1514 (or alternatively, an interface to an external display), an input component 1516 (e.g., keypad or keyboard), and a cursor control component 1518 (e.g., a mouse pad).

In accordance with embodiments of the present disclosure, system 1500 performs specific operations by processor 1504 executing one or more sequences of one or more instructions contained in system memory component 1506. Such instructions may be read into system memory component 1506 from another computer readable medium, such as static storage component 1508. These may include instructions to create accounts, process applications, process financial transactions, make payments, etc. In other embodiments, hard-wired circuitry may be used in place of or in combination with software instructions for implementation of one or more embodiments of the disclosure.

Logic may be encoded in a computer readable medium, which may refer to any medium that participates in providing instructions to processor 1504 for execution. Such a medium may take many forms, including but not limited to, non-volatile media, volatile media, and transmission media. In various implementations, volatile media includes dynamic memory, such as system memory component 1506, and transmission media includes coaxial cables, copper wire, and fiber optics, including wires that comprise bus 1502. Memory may be used to store visual representations of the different options for application processing, payments, financial transactions or other transactions. In one example, transmission media may take the form of acoustic or light waves, such as those generated during radio wave and infrared data communications. Some common forms of computer readable media include, for example, RAM, PROM, EPROM, FLASH-EPROM, any other memory chip or cartridge, carrier wave, or any other medium from which a computer is adapted to read.

In various embodiments of the disclosure, execution of instruction sequences to practice the disclosure may be performed by system 1500. In various other embodiments, a plurality of systems 1500 coupled by communication link 1520 (e.g., network 104 of FIG. 1, LAN, WLAN, PTSN, or various other wired or wireless networks) may perform instruction sequences to practice the disclosure in coordination with one another. Computer system 1500 may transmit and receive messages, data, information and instructions, including one or more programs (i.e., application code) through communication link 1520 and communication interface 1512. Received program code may be executed by processor 1504 as received and/or stored in disk drive component 1510 or some other non-volatile storage component for execution.

Where applicable, various embodiments provided by the present disclosure may be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein may be separated into sub-components comprising software, hardware, or both without departing from the spirit of the present disclosure. In addition, where applicable, it is contemplated that software components may be implemented as hardware components, and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. It is contemplated that various alternate embodiments and/or modifications to the present disclosure, whether explicitly described or implied herein, are possible in light of the disclosure.

Having thus described embodiments of the disclosure, persons of ordinary skill in the art will recognize that changes may be made in form and detail without departing from the scope of the disclosure. Thus the disclosure is limited only by the claims.

What is claimed is:

1. A secure application network system comprising:
a service provider server adapted to interact with an application development server and one or more client devices of different types over a network, wherein the service provider server is adapted to implement the secure application network system;
one or more processors; and
one or more memories adapted to store a plurality of machine-readable instructions which when executed by the one or more processors are adapted to cause the secure application network system to:
maintain, by the service provider server, a plurality of records associated with at least one application developer using the application development server wherein the plurality of records further comprise application developer account and profile information that is created based on, at least in part, the application developer's typical behavior in transactions;
authenticate the at least one application developer based on the plurality of records; and
enable the at least one authenticated application developer to create and/or deploy one or more applications operable on the different types of client devices to be downloaded by a user of at least one of the different types of the client devices from the secure application network system.

2. The system of claim 1, wherein the service provider server further comprises a payment service provider.

3. The system of claim 1, wherein the plurality of records further comprise signature information as well as account information and profiles of the at least one application developer.

4. The system of claim 1, wherein the machine-readable instructions when executed by the one or more processors are adapted to cause the system to:
provide a Software Development Kit (SDK) to the application development server to allow the application development server to build and test the one or more applications operable on the one or more client devices.

5. The system of claim 1, wherein the machine-readable instructions when executed by the one or more processors are adapted to cause the system to:
receive registration information from the at least one application developer to open an account;
provide a tool and/or a site for the at least one application developer to log in.

6. The system of claim 1, wherein the machine-readable instructions when executed by the one or more processors are adapted to cause the system to assign each of the one or more applications a unique application identifier.

7. The system of claim 6, wherein the plurality of records further comprise the registration information and the unique application identifier of the at least one application developer.

8. The system of claim 1, wherein the machine-readable instructions when executed by the one or more processors are adapted to cause the system to:
provide the client device an authenticity check application for downloading;
locate all applications installed on the client device; and
identify and show applications that are verified on the client device.

9. The system of claim 8, wherein the machine-readable instructions when executed by the one or more processors are adapted to cause the system to:
query identification information of the at least one application developer in connection with one or more specific applications installed on the client device;
create a checksum of the one or more specific applications from the at least one application developer;
use the checksum and the identification information to compare to the plurality of records maintained by the service provider server to verify authenticity.

10. The system of claim 1, wherein the client device further comprises a mobile device, a personal computer, a wireless telephone, a personal digital assistant (PDA), a key fob, a smart phone, a smart card, a notebook computer, a game console, or a digital video recorder (DVR).

11. The system of claim 1, wherein the machine-readable instructions when executed by the one or more processors are adapted to cause the system to:
receive feedback information entered by the user about the one or more applications;
store the feedback information and link the feedback information to the one or more applications and/or the at least one application developer; and
make available the feedback information to future users of the one or more applications.

12. The system of claim 11, wherein the feedback information is made available to the future users of the one or more applications through a service provider application, a tool or a website.

13. The system of claim 11, wherein the feedback information is made available to partners or associated entities of the service provider server through a secure connection.

14. A computer-implemented method for providing a secure application network by a service provider server comprising:
maintaining a plurality of records associated with at least one application developer, wherein the plurality of records further comprise application developer account and profile information that is created based on, at least in part, the application developer's typical behavior in transactions;
authenticating the at least one application developer based on the plurality of records; and
enabling the at least one authenticated application developer to create and/or deploy one or more applications to users of one or more different types of user devices from the secure application network.

15. The method of claim 14, further comprising providing a Software Development Kit (SDK) to the at least one application developer to allow the at least one application developer to build and test the one or more applications to the users.

16. The method of claim 14, further comprising assigning to each of the one or more applications a unique application identifier.

17. The method of claim 14, further comprising:
receiving registration information from the at least one application developer to open an account; and
providing a mechanism for the at least one application developer to log in.

18. The method of claim 14, further comprising:
providing an authenticity check application for downloading to a client device;
locating all applications installed on the client device; and
identifying and showing applications that are verified on the client device.

19. The method of claim 18, further comprising enabling the client device to download verified applications from the secure application network.

20. The method of claim 18, further comprising:
querying identification information of the at least one application developer in connection with one or more specific applications installed on the client device;
creating a checksum of the one or more specific applications from the at least one application developer;
using the checksum and the identification information to compare to the plurality of records to verify authenticity.

21. The method of claim 14, further comprising:
receiving feedback information entered by the users about the one or more applications;
storing the feedback information and linking the feedback information to the one or more applications or the at least one application developer; and
making available the feedback information to future users of the one or more applications.

22. The method of claim 21, further comprising making available the feedback information to partners or associated entities of the service provider server through a secure connection.

23. The method of claim 14, further comprising providing one or more notifications to a user in connection with the one or more applications.

24. The method of claim 23, wherein the one or more notifications include checking whether the user has a latest version of the one or more applications, whether the one or more applications are blacklisted or blocked, or whether feedback information about the one or more applications has changed.

25. The method of claim 14, wherein the authenticating further comprises working with the at least one application developer on the backend to authenticate the one or more applications wherein an API is received from the at least one application developer to accelerate verification functionality 26. A non-volatile computer readable medium on which are stored computer readable instructions and, when executed by a processor, cause the processor to:
receive and maintain, by a service provider server that implements a plurality of platforms correspondingly associated with at least one application developer, information associated with the at least one application developer, wherein the information further comprises identification information, account information, and profile information created based on, at least in part, the at least one application developer's typical behavior in transactions;

authenticate the at least one application developer based on the received and maintained information; and enable the at least one authenticated application developer to create and/or deploy applications, which are operable on different types of client devices, to a user of a client device wherein the client device is adapted to download the applications from the secure network of platforms.

27. The medium of claim 26 wherein the processor further comprises a processor of a payment service provider.

* * * * *